UNITED STATES PATENT OFFICE.

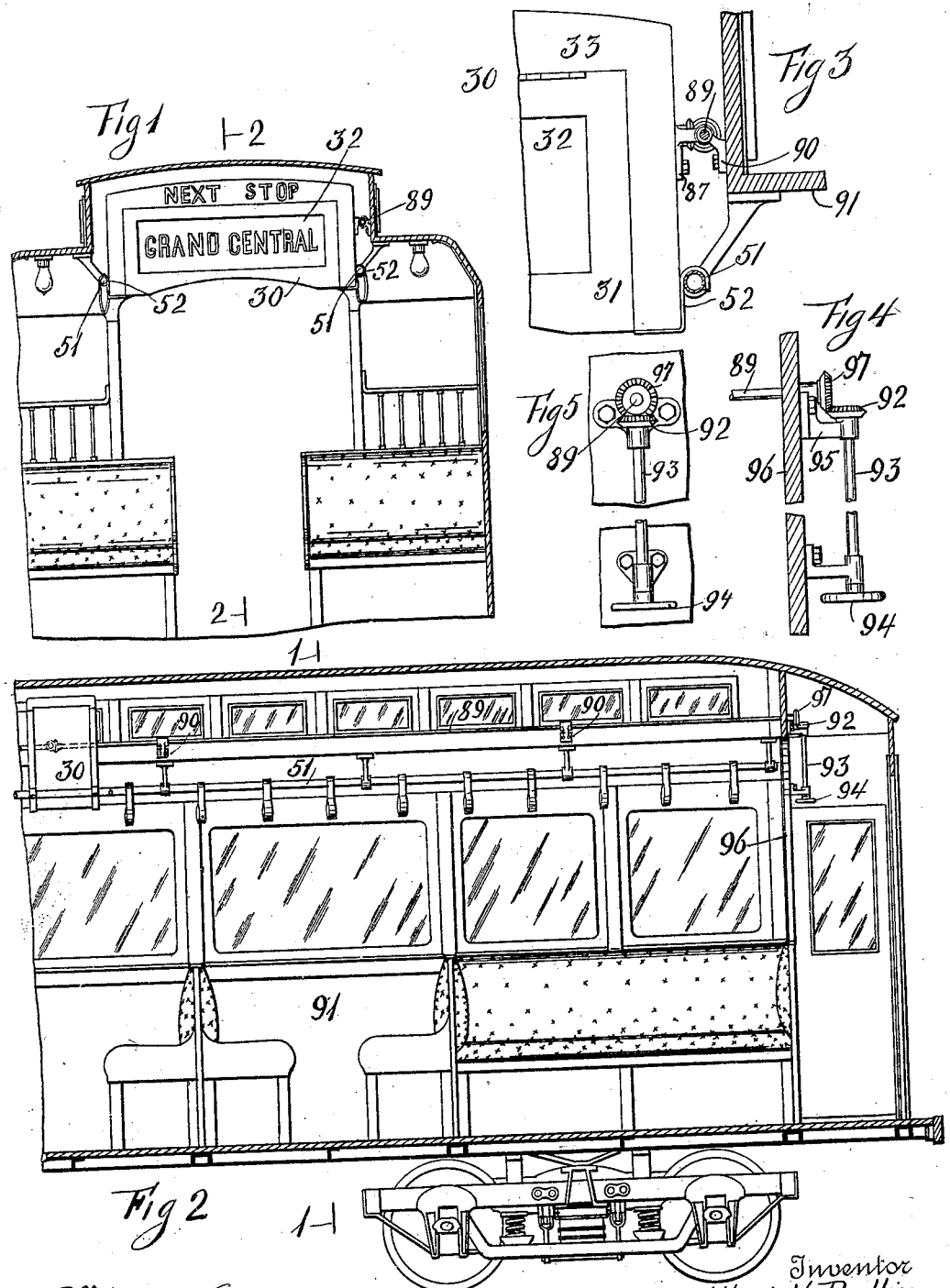

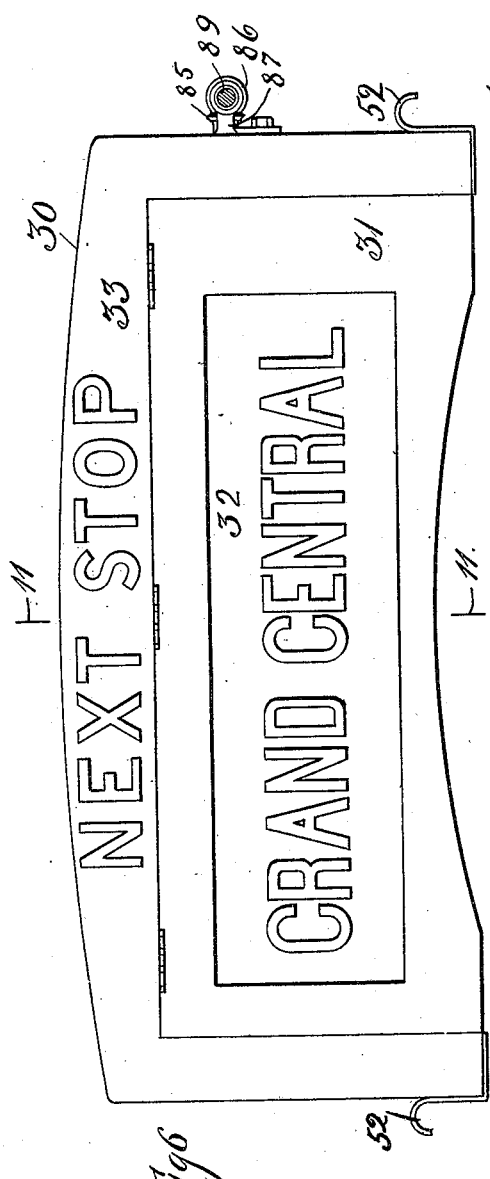
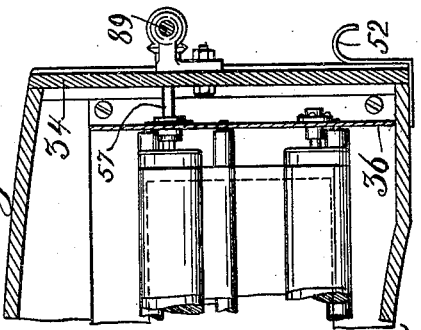
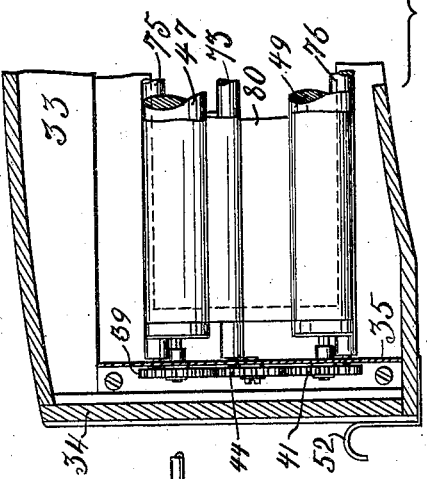
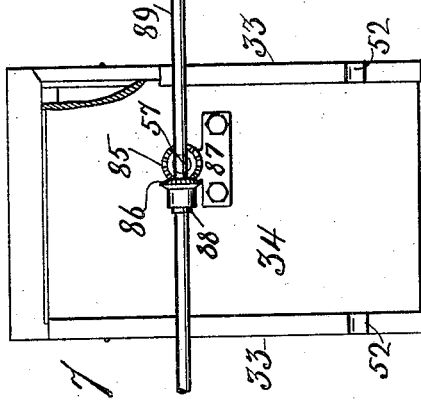

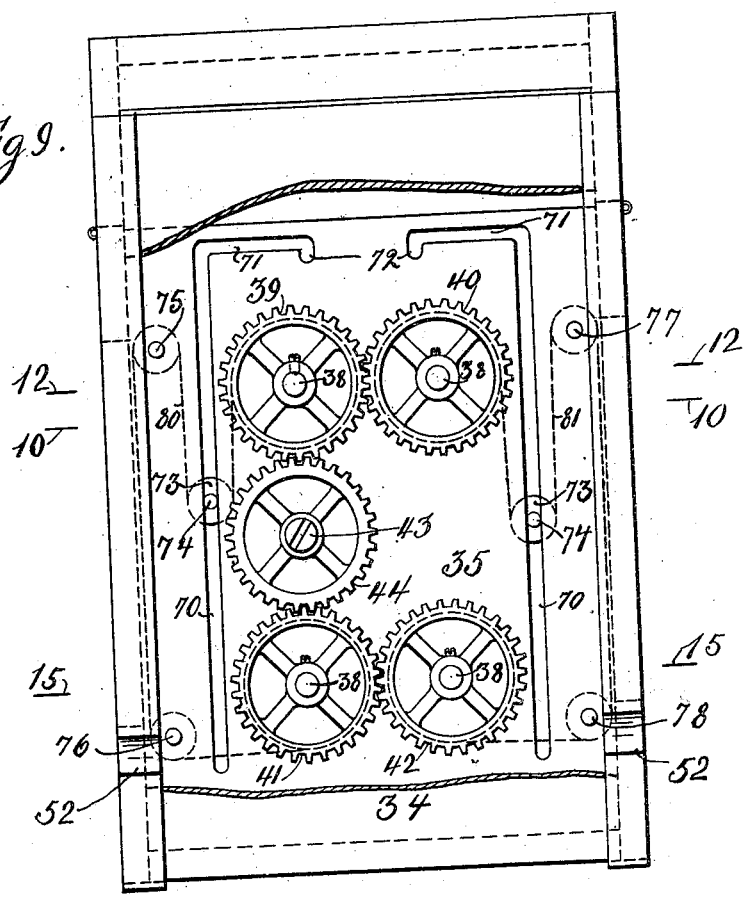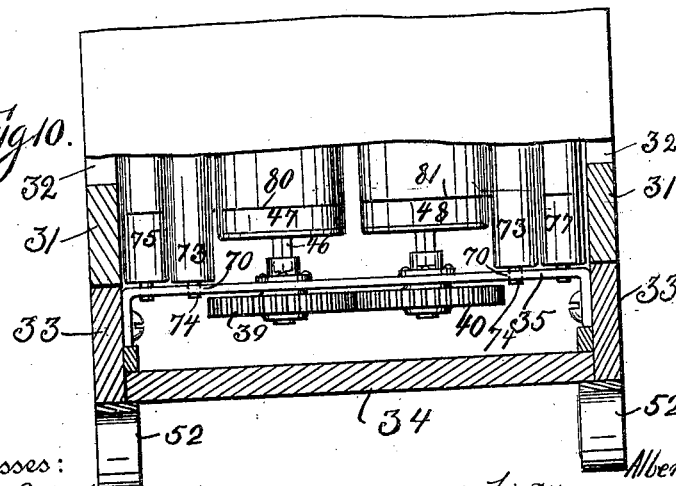

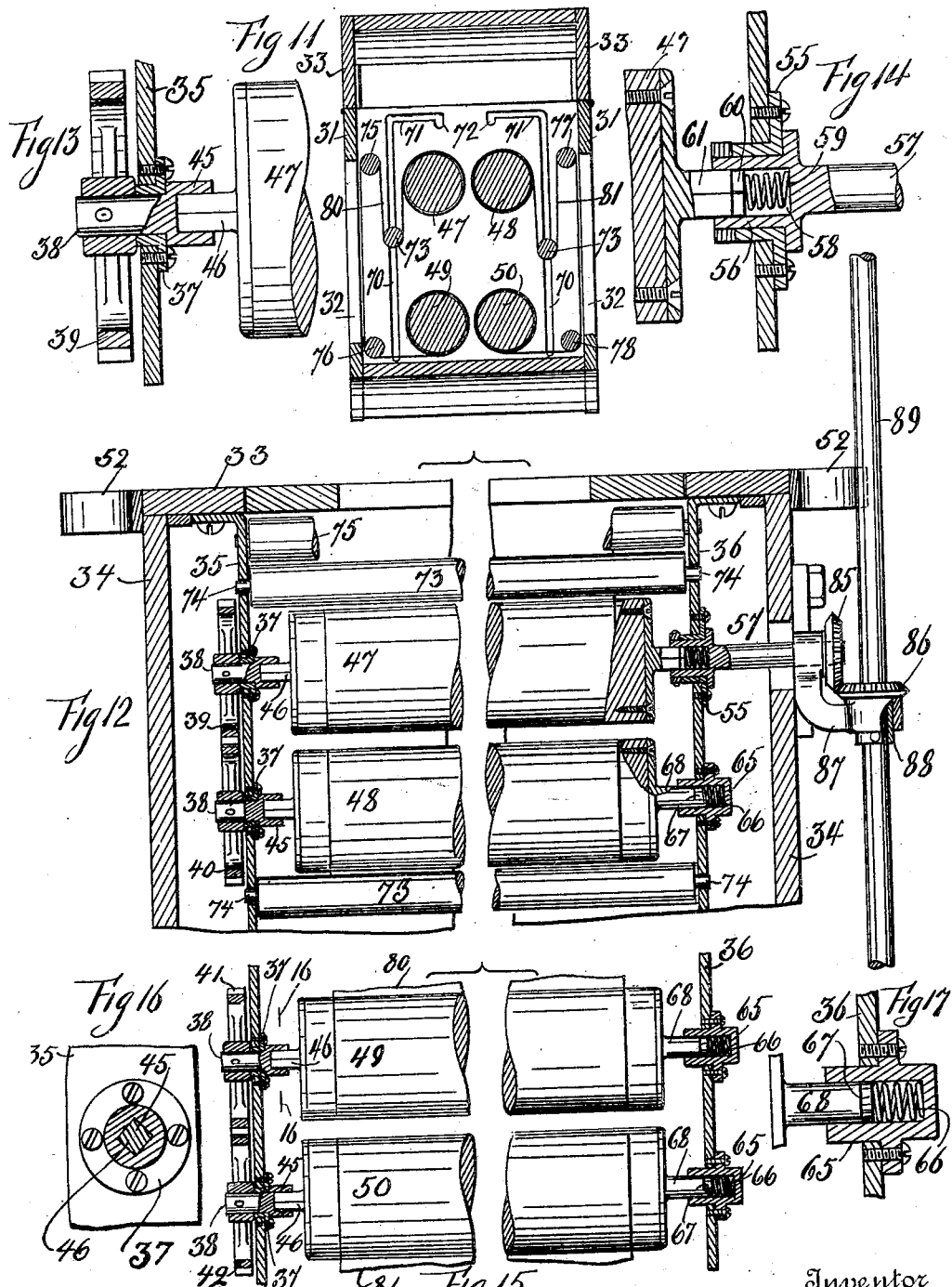

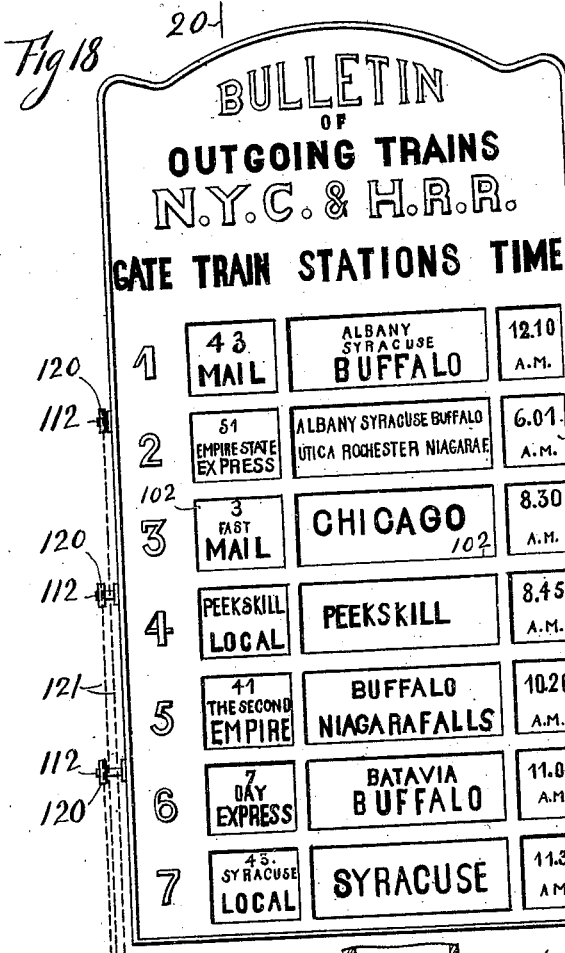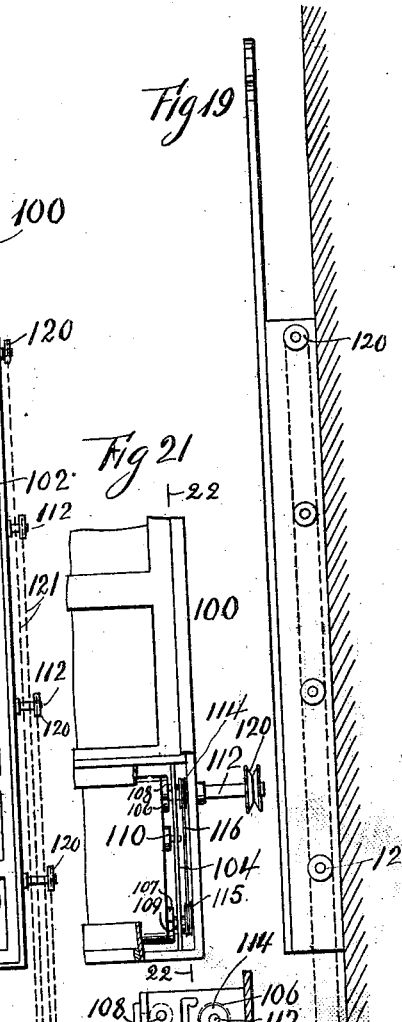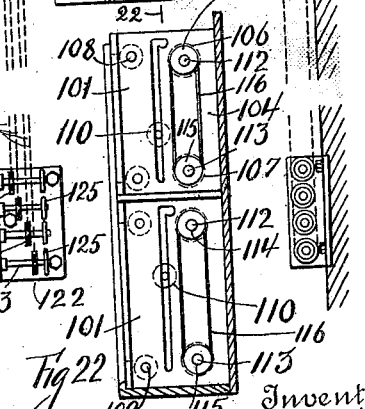

ALBERT V. BALLIN, OF YONKERS, NEW YORK, ASSIGNOR TO THE BALLIN INDICATOR COMPANY, OF NEW YORK, N. Y., A CORPORATION OF NEW YORK.

INDICATOR.

No. 922,238.

Specification of Letters Patent.

Patented May 18, 1909.

Application filed May 31, 1907. Serial No. 376,705.

*To all whom it may concern:*

Be it known that I, ALBERT V. BALLIN, a citizen of the United States, and a resident of Yonkers, in the county of Westchester and State of New York, have invented certain new and useful Improvements in Indicators, of which the following is a specification.

This invention relates to an indicator, for exhibiting different numbers, signs, words and the like at the will of an operator. In the accompanying application it is shown as a station indicator in a railway car, and also in a railway station, but its operation and construction is such that it can be used for many other purposes.

The organization of the invention comprises one or more pairs of drums upon which are wound flexible sheets of material, the drums being placed requisite distances apart so that a word, numeral or sentence can be displayed upon the sheet of material extending between rollers adjacent to the drums, and means for maintaining the said material taut. The material is kept taut by means of an adjusting roller which bears against the said material, and by means of which not only a flat surface is obtained when the sheet of material with its number, word, &c.
is presented to the observer, avoiding the crimping thereof, but the sheet rolls on one drum and unrolls from the other without bulging.

Figure 1 represents a cross-section of a car as on the line 1, 1, of Fig. 2 with the invention exemplified therein, Fig. 2 shows a partial section of Fig. 1 as on the line 2, 2, of Fig. 1, Fig. 3 is an enlarged portion of Fig. 1, Fig. 4 is an enlarged portion of Fig. 2, Fig. 5 shows an end view of Fig. 4, Fig. 6 represents an enlarged front elevation of the main portion of the invention, Fig. 7 shows a right hand end view of Fig. 6, Fig. 8 is a partial section of Fig. 7 on the line 8, 8, Fig. 9 represents an enlarged partial left hand end view of Fig. 6, Fig. 10 is a partial section of Fig. 9 on the line 10, 10, Fig. 11 is a section of Fig. 6 on the line 11, 11, Fig. 12 shows a partial section of Fig. 9 on the line 12, 12, Figs. 13 and 14 are enlarged portions of Fig. 12, Fig. 15 is a partial section of Fig. 9 on the line 15, 15, Fig. 16 is an enlarged section of Fig. 15 on the line 16, 16, Fig. 17 is an enlarged portion of Fig. 15, Fig. 18 represents a front view of a modification of the invention, Fig. 19 is a side view of Fig. 18, Fig. 20 shows a partial section of Fig. 18 on the line 20, 20, Fig. 21 shows a partial enlarged view of Fig. 18 partly in section, Fig. 22 shows a section of Fig. 21 on the line 22, 22.
The invention is represented with a box or casing 30 having hinged doors 31 with openings 32 in its sides 33, and the slides 34 at its ends. Hooks 52 extend from the casing 30 which bear on the rails 51. Frames 35 and 36 extend between and are fastened to the sides 33. Bushings 37 are secured to the frame 35 which constitute bearings for the shafts 38 that carry the spur gears 39, 40, 41 and 42. On a pin 43 secured in the frame 35 is journaled a spur gear 44. The gears 39 and 40 as well as the gears 41 and 42 mesh with each other, and the gear 44 meshes with the gears 39 and 41. The right hand ends of the shafts 38 have formed with them square shaped sockets 45, which latter support square shaped spindles 46 extending from the left hand ends of the upper drums 47, 48 and lower drums 49 and 50. The said drums are all parallel to each other. The frame 36 has attached thereto the bushing 55 in which is journaled the socket end 56 of a shaft 57. The opening 58 in the socket end 56 is square shaped and contains the spring 59, a bearing button 60, and a square shaped spindle 61 extending from the right hand end of the drum 47. To the frame 36 are also fastened the cylindrical socket bearings 65 which contain the springs 66, bearing buttons 67 and the cylindrical spindles 68 extending from the right hand ends of the drums 48, 49 and 50.

In the frames 35 and 36 are formed the vertical slots 70 with the horizontal legs 71 and bearings 72. Regulating rollers 73 have spindles 74 extending from their ends which latter are engaged by the said slots 70. Upper guide rollers 75, 77 and lower guide rollers 76, 78 are journaled in the frames 35 and 36 adjacent to said drums. A sheet of paper 80 or other flexible material extends from the upper drum 47, passes under one of the regulating rollers 73, thence over the guide roller 75, next under the guide roller 76 to the lower drum 49. A sheet of paper 81 or other flexible material extends from the upper drum 48 then under the other regulating rollers 73, next over the guide roller 77, then down under the guide roller 78 and thence to the lower drum 50. It will be noted that the pairs of guide rollers 75, 76 and 77, 78 are vertically more distant from each other than the drums 47, 49 and 48, 50; and the regulating rollers 73 are guided in vertical slots between the said guide rollers and their accompanying drums.

On the right hand end of the shaft 57 (see Fig. 12) is fastened a bevel gear 85 which meshes with a bevel gear 86. A bracket 87 is fastened to one of the ends 34 of the case 30 and has formed therewith journal bearings for the shaft 57 and the hub 88 of the bevel gear 86. A shaft 89 is fastened to the hub 88 and is supported in journal brackets 90 fastened to the upper portion of the car 91. The said shaft 89 extends on both sides of the case 30. On each end of the shaft 89 is fastened a bevel gear 97 that meshes with a bevel gear 92, the latter gear being fastened to a vertical spindle 93 with hand wheel 94. A journal bracket 95 is fastened to each end 96 of the car and supports the ends of the shafts 89 and spindles 93.

It will be noted that the regulating rollers 73 are suspended by the sheets of material 80 and 81, and that the said regulating rollers maintain the said material taut, during all positions thereof, and irrespective of whether the most of the material is on the upper or lower drums.

In the modified form of the invention a number of indicators are housed in one casing (see Figs. 18 to 22), as 100, which contains the chambers 101 with openings 102.
Frames 104 with vertical slots 105 are located in said chambers. An upper drum 106 and a lower drum 107 are located in each chamber and journaled in said frames. An upper guide roller 108 and a lower guide roller 109 are journaled in the frames 104 adjacent to the drums. A regulating roller 110 engages with the slots 105 and is movable with reference to the drums 106 and 107. A sheet of flexible material 111 with numbers, signs or words thereon extends from the upper drum and passes under the regulating roller 110 from which it passes over the upper guide roller 108 then down opposite an opening 102 in the casing 100, next under the lower guide roller 109 and finally to the lower drum 107. Spindles 112 and 113 extending from the drums have secured thereto the pulleys 114, 115 which are connected by a belt or chain 116. The spindles 112 extend outside of the casing 100 and have attached thereto sprocket chain wheels 120 with chains 121.

Below the case 100 is preferably located a pair of brackets 122 which have journaled therein spindles 123 that carry sprocket chain wheels 124 and hand wheels 125. The chains 121 extend from the chain wheels 120 to and around the chain wheels 124.

To operate the invention and referring to Figs. 1 to 17, a user has simply to turn the hand wheel 94 on either end of the car until the proper number, sign, word &c. is exposed to view at the openings 32. When the sheet of material unwinds from either of the upper or lower drums and winds up on its accompanying drum, the weight of the regulating roller bearing on the sheet will maintain it taut.

In the modification shown in Figs. 18 to 22 the operator turns any of the hand wheels 125 to set any of the indicators with the requisite name or sign opposite any of the openings in the case. It will be noted that the brackets 122 with their appurtenances could be dispensed with and the chains would then be handled by the operator to turn the drums.

To disengage any of the drums from the case and referring specially to Figs. 12 to 17, it is accomplished by moving any of the drums to the right against the tension of the springs 58 or 66 when the spindle 46 can be unlocked from its socket 45. The drum can be removed through one of the openings in the sides of the case.

It will be noted that when the drum 47 is rotated by means of the shaft 57 that all the drums are rotated in unison and that both the sheets 80 and 81 are moved at the same time.

The regulating rollers 73 can be lifted up into the horizontal legs 71 and in the bearings 72 to be out of the way when a drum is to be taken out of the case, or any adjustments of the device are to be made.

Having described my invention, I claim:

1. The combination in an indicator of a casing having openings in the sides thereof, a pair of frames in the casing having vertical slots each with a horizontal leg and a bearing, a pair of upper drums and a pair of lower drums all parallel to each other journaled in said frames, means to rotate the drums in unison, an upper guide roller adjacent to each upper drum and a lower guide roller adjacent to each lower drum, regulating rollers on the opposite sides of the four drums and engaged with the slots in said frames, sheets of flexible material with signs thereon extending between each upper drum and its accompanying regulating roller, then extending over its upper guide roller, from the latter passing to its lower guide roller opposite one of the openings in the case, and finally to its lower drum, a rotatable shaft connected to one of the drums, a second shaft adjacent to said first shaft, means to connect the two shafts, and other means to rotate the second shaft.

2. The combination in an indicator of a casing having openings in the sides thereof, a pair of frames in said casing, a pair of upper drums and a pair of lower drums parallel to one another between the frames, shafts journaled in one of said frames axially in line with the drums, a spur gear fastened to each one of said shafts at one end thereof and a square shaped socket formed in the opposite end of each shaft, a fifth spur gear meshing with a pair of the other gears, square shaped spindles extending from the drums engaging the sockets of said shafts, socket bearings in the second frame axially in line with their accompanying drums, spindles extending from the drums engaged by the socket bearings, means to rotate one of the drums, a regulating roller on one side of one of the upper drums and a regulating roller on the opposite side of the other upper drum, an upper guide roller adjacent to each upper drum and a lower guide roller adjacent to each lower drum, sheets of flexible material extending between each upper drum and its accompanying lower drum and the guide roller adjacent thereto and suspending the regulating rollers to maintain the material taut.

3. The combination in an indicator of a casing having openings in the sides thereof, a pair of frames in said casing, a pair of upper drums and a pair of lower drums parallel to one another between the frames, shafts journaled in one of said frames axially in line with the drums, a spur gear fastened to each one of said shafts at one end thereof and a square shaped socket formed in the opposite end of each shaft, a fifth shaft, a socket end formed in the latter shaft journaled in the other frame and axially in line with one of the drums, a square shaped spindle extending from the latter drum and engaging the latter socket, a spring bearing between the end of the spindle and the bottom of the latter socket, cylindrical socket bearings in the second frame axially in line with the three other drums, cylindrical spindles extending from the latter drums journaled in said cylindrical socket bearings, means to rotate the fifth shaft, a regulating roller on one side of one of the upper drums and a regulating roller on the opposite side of the other upper drum, an upper guide roller adjacent to each upper drum and a lower guide roller adjacent to each lower drum, sheets of flexible material extending between each upper drum and its lower drum and the guide roller adjacent thereto and suspending the regulating rollers.

Signed at the borough of Manhattan, in the county of New York and State of New York, this 28th day of May A. D. 1907.

ALBERT V. BALLIN.

Witnesses:
MARTIN ZIMANSKY,
JOHN J. MILLIN.